(No Model.)

F. W. TOBEY & D. W. TOWER.
MIRROR ADJUSTING DEVICE.

No. 520,548.        Patented May 29, 1894.

WITNESSES:
Lewis E. Flanders
Lois Moulton

INVENTORS
Fred W. Tobey
Daniel W. Tower
BY
Luther V. Moulton
ATTORNEY.

UNITED STATES PATENT OFFICE.

FRED W. TOBEY AND DANIEL W. TOWER, OF GRAND RAPIDS, MICHIGAN, ASSIGNORS TO THE GRAND RAPIDS BRASS COMPANY, OF SAME PLACE.

MIRROR-ADJUSTING DEVICE.

SPECIFICATION forming part of Letters Patent No. 520,548, dated May 29, 1894.

Application filed June 8, 1893. Serial No. 477,010. (No model.)

*To all whom it may concern:*

Be it known that we, FRED W. TOBEY and DANIEL W. TOWER, citizens of the United States, residing at Grand Rapids, in the county of Kent and State of Michigan, have invented certain new and useful Improvements in Mirror-Adjusters; and we do hereby declare the following to be a full, clear, and exact description of the invention, such as will enable others skilled in the art to which it appertains to make and use the same.

Our invention relates to an improved mirror adjuster, and its object is to provide the same with certain new and useful features hereinafter more fully described and particularly pointed out in the claims, reference being had to the accompanying drawings, in which—

Figure 1:
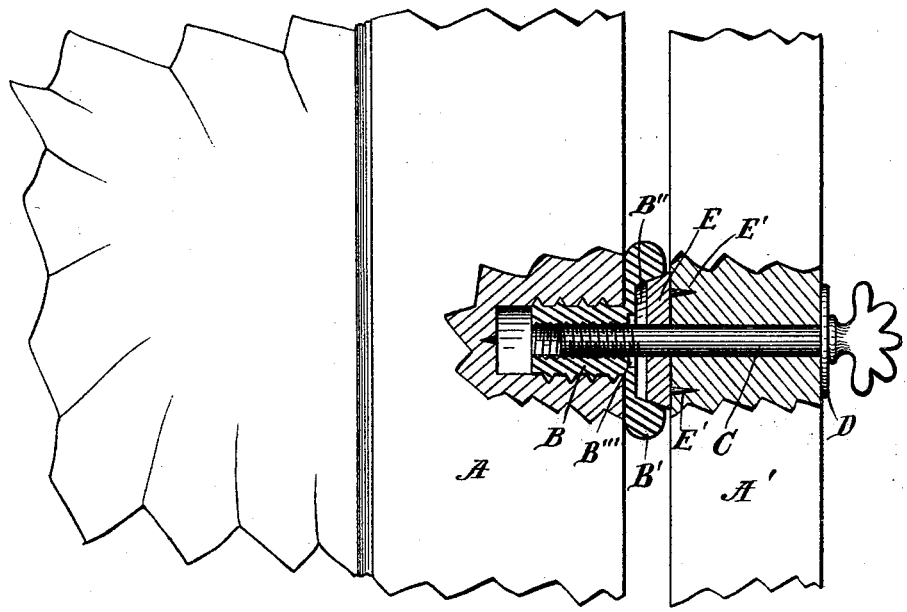
Figure 2:
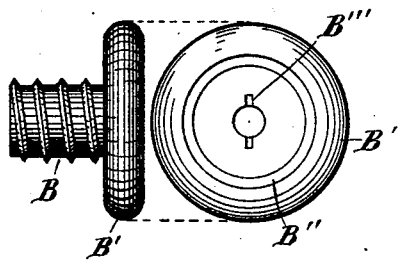
Figure 3:
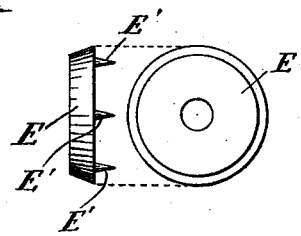

Figure 1 is an elevation of a portion of a mirror frame and supporting post, with a part broken away showing our improved device in vertical section; Fig. 2 a detail of the nut; and Fig. 3 a detail of the washer.

Like letters refer to like parts in all of the figures.

A represents a portion of the mirror frame, and A' a portion of the post supporting the same.

B is a nut or bushing having a suitable wood screw thread on its outer surface, and inserted in a suitable hole bored in the edge of the mirror frame A, for which insertion a screw driver slot is formed at B'''. In the axis of this nut is an internally threaded opening, into which is fitted the end of a pivot screw C, which screw extends through a suitable opening in the post A' and turns freely in the same, being also provided with a collar or washer D near its outer end, which collar engages the outer surface of said post.

B' is an enlarged head integral with the nut B, having a conical recess B'', within which is a washer E, having its base resting against the inner surface of the post A', and provided with spurs E' inserted in the said post to prevent the washer from turning. By this arrangement it will be seen that when the pivot screw is adjusted it will cause friction between the periphery of the washer E and the sides of the conical recess B'', and hold the mirror at any angle to which it may be adjusted. The washer also serves to support the mirror and take the strain off the pivot screw. And also by the inclined conical frictional surface, but little strain on the said screw is required to produce the necessary friction, said screw also thus turns freely in the post and does not wear the same, and is not loosened by turning the mirror.

What we claim is—

1. In a mirror adjuster, a head having a conical recess and adapted to be secured to the mirror frame, a conical washer engaging said recess and adapted to be secured to the post and support the mirror, and a binding screw to pass through said post, and force said head and washer into frictional contact, substantially as described.

2. In a mirror adjuster, the combination of a nut, or bushing, screw threaded on its outer surface, provided with a screw driver slot at its outer end, and having a threaded axial opening; a head on the outer end of said nut, a conical depression in said head, a washer in frictional contact with the surfaces of said depression, means of securing said washer, a pivot screw and a collar on the outer end of said screw, substantially as described.

3. In combination with a mirror frame and a post supporting the same; a nut inserted in the frame, having outer screw threads, and a screw threaded axial opening, an enlarged outer head on said nut and between said frame and post, a conical recess in said head, a conical washer engaging the sides of said recess, spurs on said washer inserted in said post, a pivot screw loosely journaled in said post, having screw threads engaging said threaded opening in said nut, and a collar near the outer end of said pivot screw engaging the side of said post, substantially as described.

In testimony whereof we affix our signatures in presence of two witnesses.

FRED W. TOBEY.
DANIEL W. TOWER.

Witnesses:
J. H. BEAMER,
CLARENCE E. BIGELOW.